(12) United States Patent
Grady

(10) Patent No.: US 6,979,779 B2
(45) Date of Patent: *Dec. 27, 2005

(54) SQUARE ELECTRICAL OUTLET BOX WITH EXTERIOR CLAMP SHELVES FOR HOLDING ELECTRICAL CABLES

(76) Inventor: John K. Grady, 111 Slough Rd., Harvard, MA (US) 01451

( * ) Notice: Subject to any disclaimer, the term of this patent is extended or adjusted under 35 U.S.C. 154(b) by 0 days.

This patent is subject to a terminal disclaimer.

(21) Appl. No.: 10/928,350

(22) Filed: Aug. 27, 2004

(65) Prior Publication Data

US 2005/0023021 A1  Feb. 3, 2005

Related U.S. Application Data

(63) Continuation-in-part of application No. 10/300,957, filed on Nov. 20, 2002, now Pat. No. 6,800,806.

(60) Provisional application No. 60/331,984, filed on Nov. 21, 2001.

(51) Int. Cl.$^7$ ................................. H02G 3/08
(52) U.S. Cl. ................. 174/50; 174/58; 174/63; 248/906; 439/535
(58) Field of Search ................. 174/50, 58, 63, 174/17 R; 220/3.2, 3.02; 439/535; 248/906

(56) References Cited

U.S. PATENT DOCUMENTS 2,000,850 A  *  5/1935  Knell ................. 220/3.2

* cited by examiner

Primary Examiner—Dhiru R. Patel
(74) Attorney, Agent, or Firm—Holland & Bonzagni, P.C.; Donald S. Holland, Esq.

(57) ABSTRACT

A rapid mounting, "square" electrical outlet or junction box (4" square, 4$^{11}$/$_{16}$" square, 2-gang, etc.) includes a back plate and four upstanding sidewalls attached to the back plate and defining a front opening. One or more of the sidewalls has a number of conduit knockouts, as well as a plurality of cable access ports, which allow entry of AC, MC, NM, or other cables. The sidewalls also have a mounting hole pattern for rapidly mounting the outlet box, by way of any of the sidewalls, to a wood or metal stud. Accordingly, regardless of the box's orientation, conduit and/or electrical cables can always be routed to the box, and conduits that approach the box from any direction can be easily accommodated without bending or rerouting. Among other things, the outlet box may also be provided with external cable clamps, fold-out depth tangs, device connection flanges, and pre-attached ground leads.

11 Claims, 15 Drawing Sheets

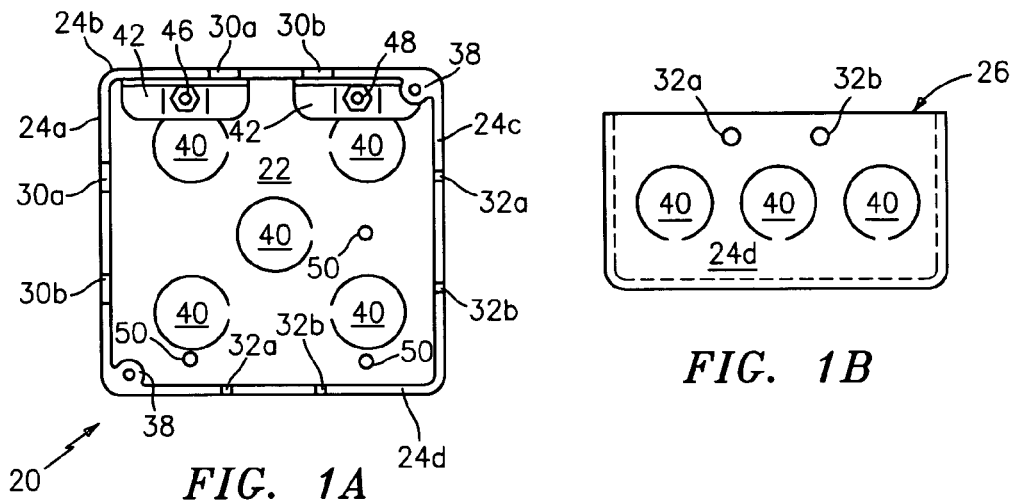
FIG. 1A
FIG. 1B
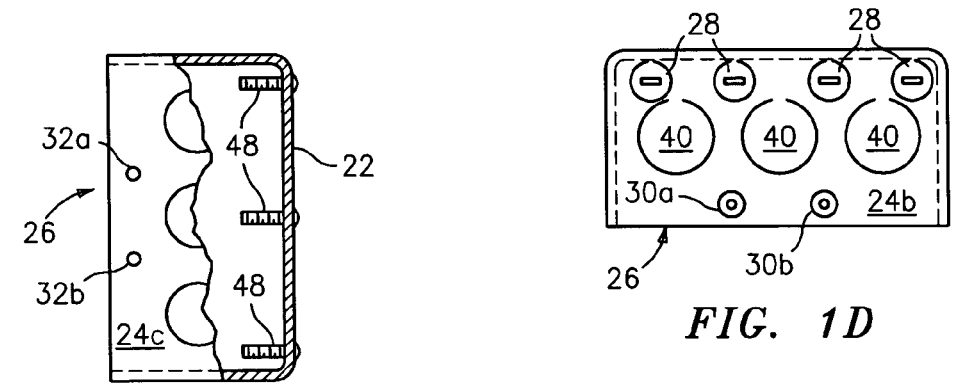
FIG. 1C
FIG. 1D
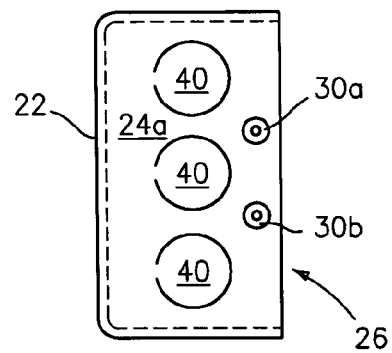
FIG. 1E

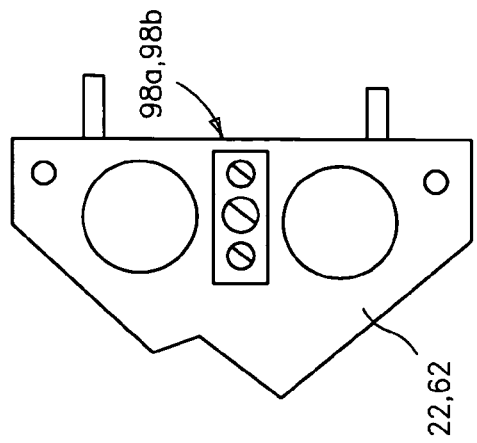
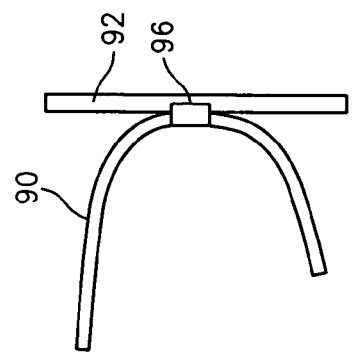
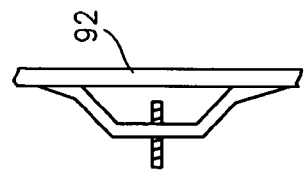
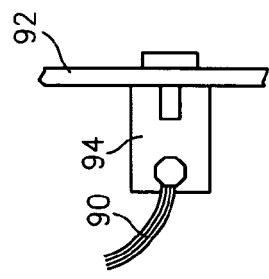
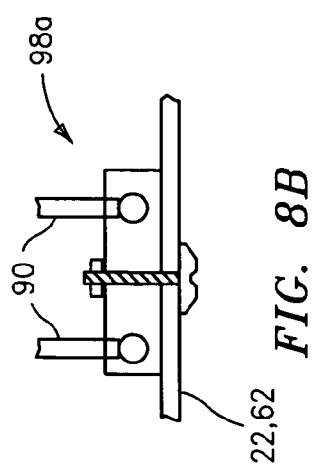
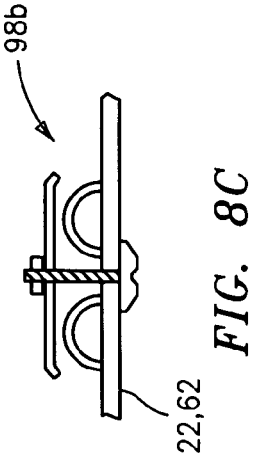
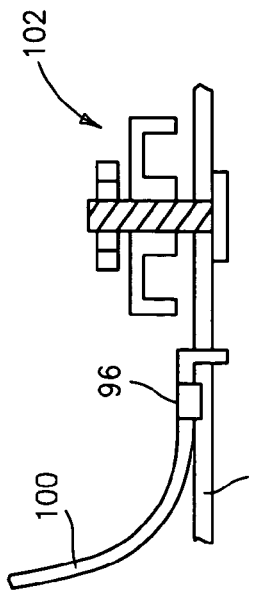

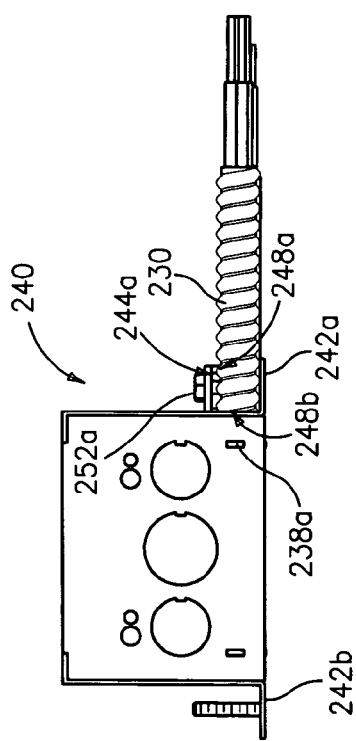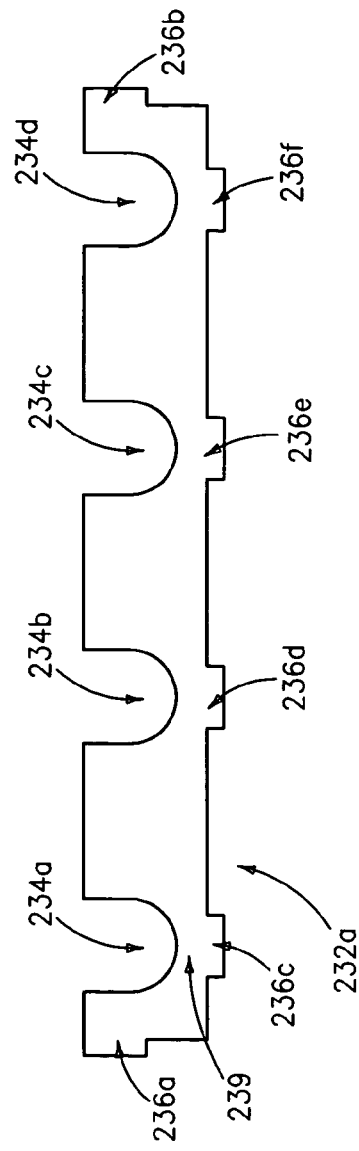

SQUARE ELECTRICAL OUTLET BOX WITH EXTERIOR CLAMP SHELVES FOR HOLDING ELECTRICAL CABLES

This application is a continuation-in-part of an Utility patent application, Ser. No. 10/300,957, filed Nov. 20, 2002, now U.S. Pat. No. 6,800,806, issued Oct. 5, 2004, which claims priority from a Provisional Application, Ser. No. 60/331,984, filed Nov. 21, 2001. Applicant hereby disclaims the terminal part of any patent granted on the instant application, which would extend beyond the expiration date of U.S. Pat. No. 6,800,806.

FIELD OF THE INVENTION

The present invention relates to electrical devices, and, more particularly, to electrical outlet boxes.

BACKGROUND

Electrical outlet or junction boxes are commonly, if not universally, used in residential and commercial buildings as a means for holding electrical devices (outlets, switches, etc.), and for holding and/or guiding the electrical wires or cables that are attached to the electrical devices. Electrical outlet boxes typically comprise a rectangular, square, or octagonal metal or plastic "box" having one open side and a plurality of knockouts (partially stamped or scored portions that can be easily removed to form conduit or cable through-holes) on the other sides. Outlet boxes can be attached directly to a wall ("surface mounting," oftentimes used in industrial settings), or they can be attached to the sides of a wall's metal or wood support members (studs or joists), with the interior of the outlet box being exposed by way of a hole in the wall covering ("flush mounting").

For flush mount applications, the electrical outlet box must be somehow fastened to the side of a stud or joist. Frequently, this is done by angling a fastener screw or the like through the open front of the box, through an angled fastener aperture provided in one of the box's sides, and into the stud or joist. U.S. Pat. No. 6,100,469 to Jorgensen et al. shows such an outlet box. Alternatively, separate mounting brackets can be used, as shown in U.S. Pat. No. 4,572,391 to Medlin, or the electrical box can be provided with external mounting wings or brackets, as shown in U.S. Pat. No. 6,198,045 to Roesch.

While these attachment mechanisms are functional, they suffer from certain drawbacks. For example, angled fasteners do not work well with metal studs, require significant precision, and are relatively time consuming to use, while separate brackets can increase both cost and time (i.e., a separate bracket has to be purchased, which then has to be separately attached to both the box and stud). If the bracket is pre-attached, it must be set at the correct depth for the wall finish contemplated, leading to an inventory problem of many different preset depth box variations. Also, external mounting wings or brackets increase manufacturing costs, and, since they extend beyond the box body itself and are relatively bulky, greatly limit how the box can be oriented for attachment to a wall stud. This can be especially problematic when cables or conduit come at the outlet box at a particular angle, e.g., at a side where the box might not have the proper series of knockouts, if any at all, or the access is inhibited by the pre-attached bracket. The flange, or bracket, if placed on the front of the stud, as is common, also leads to aesthetic problems. It can create a bulge in the wall finish when Gypsum Board or "drywall" is used, the most common finish today.

More specifically, in wiring most modern buildings, there is oftentimes a mix of various types of wiring (armored or sheathed electrical cable, conduit, data lines, etc.), all of which may need to be routed to and/or through an outlet or junction box. Moreover, conduit is typically rigid, and cannot be bent in a small radius to accommodate misaligned conduit knockouts. Unfortunately, most electrical outlet boxes cannot easily handle a mix of multiple cables and conduit, and, even if they can, are relatively inflexible in terms of cable/conduit placement, e.g., the box can only accommodate vertical or horizontal conduit, but not both, or cable runs must be made up to look like conduit (box connectors).

Finally, many outlet boxes include cable clamps, which are attached to the interior of the outlet box by a screw extending through the clamp, through a tapped hole in the box, and out the back of the box. Ground screws, by which a ground wire is affixed to the box, also typically project past the back of the box. The mounting screw especially can be a problem when the excess, projecting thread hits another box (in back-to-back mountings), or hits a hard surface like a masonry block wall. Masonry requires the electrician to cut off the projecting screw after tightening it, which is problematic and time consuming. Also, the cable clamps: (i) are bulky, taking up a lot of space inside the outlet box; (ii) only provide one point for securing the cables, which can become dislodged or loose if pulled sideways; and (iii) are sharp and can cut wiring when it is pushed back inside the box.

Accordingly, a primary object of the present invention is to provide an electrical outlet or junction box with enhanced-performance cable clamps located on the exterior of the outlet box, thereby liberating interior space for cable connections and/or loop-throughs.

Another object of the present invention is to provide such an electrical outlet or junction box with a design that retains clamped cable in at least three places along its axial length.

Another object of the present invention is to provide such an electrical outlet or junction box that can be quickly and easily affixed to the side of a stud or joist, and especially to metal studs, without causing a drywall bulge.

Another object of the present invention is to provide such an electrical outlet or junction box that can be oriented to align with incoming conduit while still accommodating a mix of multiple cables and conduits, even on the same box wall.

Another object of the present invention is to provide such an electrical outlet or junction box with screws or studs extending inwardly, toward the finish wall surface, for ground and cable clamp retention, so as to eliminate excess thread extending past the back of the box.

SUMMARY

A rapid mounting, "square" electrical outlet or junction box (4" square, 4$\frac{11}{16}$" square, 2-gang, etc.) comprises a back plate and four upstanding sidewalls attached to the back plate and defining a front opening. One or more of the sidewalls has a number of ½" or ¾" conduit knockouts, as well as a plurality of cable access ports, which allow entry of AC, MC, NM, or other cables. The sidewalls also have a mounting hole pattern for mounting the outlet box. In one version, for each pair of opposing sidewalls, the mounting hole pattern comprises a pair of guide holes, large enough to pass a screw and driver bit, on one sidewall, and a pair of aligning fastener apertures, only large enough to pass a screw shank, on the opposing sidewall. In a second version, for each pair of opposing sidewalls, the mounting hole pattern comprises two guide holes and two fastener apertures on each sidewall, wherein the guide holes on each sidewall align with the fastener apertures on the opposite sidewall. In both versions, the aligned mounting holes extending through the sides of the outlet box permit the box to be rapidly attached to a stud with standard screws and a power screwdriver. Since the mounting holes are not angled and no attachment brackets are required, the outlet box is especially adapted for use with metal studs and self tapping/ drilling screws.

Also, because the mounting hole pattern (guide holes and fastener apertures) is repeated on both pairs of opposing sidewalls, the outlet box can be mounted to the right or left side of a stud, while still enabling the box sidewall(s) with the cable access ports to be accessible, e.g., facing up, down, or to the side. Accordingly, regardless of the box's orientation, electrical cables can always be routed to the box, while conduits can be routed to either the top, left or right sides (through a hole in the stud, if needed), or bottom side. Thus, conduits that approach the box from any direction can be easily accommodated without bending or rerouting.

Additional embodiments of the outlet box include a pair of clamp shelves for mounting cable clamps on the outside of the outlet box. The clamp shelves are perpendicular to the sidewalls, i.e., extend at right angles to their respective sidewalls, and are generally coplanar with (or located proximate to) the back plate, i.e., the clamp shelves are positioned next to the cable access ports for holding cables entering into the outlet box. The clamp shelves each include a pair of forward-facing clamp studs, which obviates the need for screws extending out past the back plane of the outlet box, as might interfere with a rear section of wall, masonry, or drywall, especially common with masonry block walls furred with metal studs. The clamp shelves may include: a forward-facing retainer/locating lip for holding cables in place; and reversible clamp covers which have one side suitable for holding plastic-jacket cable and an opposite side with a retainer/locating lip for holding metal sheathed cable. For protecting the cable wire entering into the box and for retaining "red head" metallic cable bushings, the outlet box may also be provided with fence-like, insulator stop plates located inside the outlet box and just inside from the cable access ports. Note that the metal-jacketed cable body is retained mechanically in several places: at the upturned lip, by each clamp, by passing through the box wall, and by the stop plate. This prevents lateral slide out, a major problem with some existing designs of cable clamps.

BRIEF DESCRIPTION OF THE DRAWINGS

These and other features, aspects, and advantages of the present invention will become better understood with respect to the following description, appended claims, and accompanying drawings, in which:

FIG. 1A is a front plan view of a first embodiment of an electrical outlet box according to the present invention, showing an interior of the outlet box;

FIGS. 1B–1E are various side plan views of the electrical outlet box shown in FIG. 1A (FIG. 1C is partially in section);

FIG. 4C is a cross-sectional view of the electrical outlet box shown in FIG. 4A, taken along line 4C—4C, while

FIGS. 7A–9 are schematic views of various means for attaching electrical ground wires to the outlet box;

FIG. 16C is a plan view of one of the interior stop plates shown in FIG. 16A;

FIG. 17C is a side elevation view of the outlet box shown in FIGS. 17A and 17B.

DETAILED DESCRIPTION

Figure 2A:
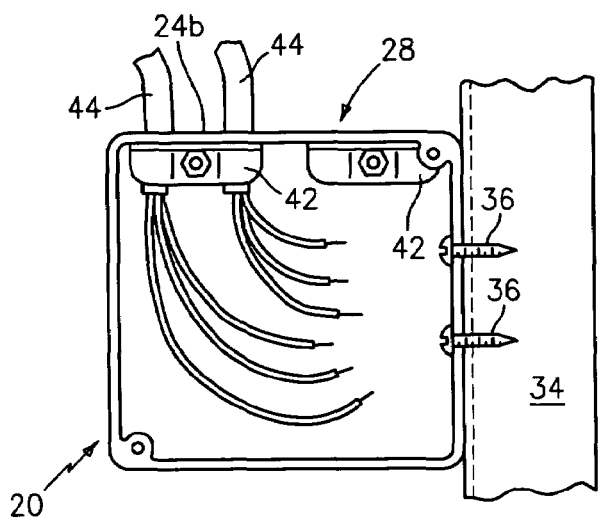
FIGS. 2A–2C are front plan views of the electrical outlet box attached to a stud, at different orientations (FIG. 2A shows the box in use with a pair of cables, while FIG. 2C shows an additional pair of cable clamps)

With reference to FIGS. 1A–3, a first preferred embodiment of a rapid mounting, square outlet box 20 comprises a back plate 22 and four upstanding sidewalls 24a–24d (referred to as "left" and "right" sidewalls 24a, 24c, and "top" and "bottom" sidewalls 24b, 24d, respectively) attached to the back plate 22 and defining a front opening 26. The top sidewall 24b has four cable access ports 28 (through-holes or knockouts), which allow entry of up to four AC, MC, or NM cables. Additionally, the top sidewall 24b has guide holes 30a, 30b, while the bottom sidewall 24d has aligning fastener apertures 32a, 32b, a pattern that is repeated on the left and right sidewalls 24a, 24c, respectively. The aligned guide holes and fastener apertures extending through the sides of the outlet box 20 permit it to be rapidly attached to a stud 34 (and, since the mounting holes are not angled, especially to metal studs) with self-drilling screws 36 and a power or manual screwdriver 37. Also, because the mounting hole pattern (guide holes and fastener apertures) is repeated on both pairs of opposing sidewalls, the outlet box 20 can be mounted to the right or left side of a stud 34 by rotating the box in 90° increments, while still enabling the top sidewall 24b, with the cable access ports 28, to be accessible, e.g., facing up, down, or to the side.

The electrical outlet box 20, as mentioned, is "square." By this, it is meant that the box 20 will typically be provided in a standard, generally-square configuration, such as a 4" square box, a 4¹¹⁄₁₆" square box, or a two-gang box. However, as should be appreciated, the box 20 could have other height-width dimensions. Also, the box 20 will typically be from about 2.5" to about 3" deep, although it could be shallower or deeper. The box 20 may have two standard 4" square bolt patterns with four circular holes (not shown) on opposite sides of the box, or the patterns shown in FIG. 1A (e.g., two apertured flanges 38 on opposite corners of the box at the ends of the sidewalls), or it may have other device patterns, e.g., a two gang device pattern (not shown), provided by way of appropriately spaced flanges or the like. The 4" square bolt patterns (four holes) can be repeated so the box can be still used after a 90° rotation.

The outlet box 20 comprises the back plate 22 and the four sidewalls 24a–24d attached to the back plate 22 and defining the front opening 26. The back plate 22 has a plurality of ½ conduit knockouts 40 (the back plate shown in FIG. 1A has five knockouts), while the sidewalls 1B–1E each have three generally-centered conduit knockouts 40. Alternatively, the back plate and sidewalls may have ¾" knockouts, concentric knockouts, combinations of different types of knockouts, different numbers of knockouts, and/or the knockouts may be located at different positions. Further, the top sidewall 24b has the four cable through-holes or knockouts 28, which are positioned in a line near the back plate 22. These allow for the entry of four AC (armored), MC (metal clad), or NM (nonmetallic sheathed) cables on one side of the box 20, or two side by side cables, offset to one side, via paired cable clamps and knockouts, on the same side a conduit may enter.

In particular, as shown in FIG. 1A, the box 20 has two standard cable clamps 42 (e.g., configured to clamp NM, AC, or MC cable) on the inside of the box 20 and connected to the back plate 22 proximate the cable access ports 28. Thus, on the top sidewall 24b of the box 20, multiple cables 44 can be passed through the access ports 28 and clamped into place by the cable clamps 42, as shown in FIG. 2A. The cable clamps 42 can be connected or tightened down to the back plate 22 in a conventional manner (e.g., by way of a screw), or the clamps can be tightened by a nut 46 driven down over a stud or bolt 48 pressed in or welded in from the back side of the back plate 22. This eliminates any long screws projecting from the back of the outlet box 20, which can be a problem when installing the box in "furred" walls, where there is typically a concrete block backing. To accommodate the bolts 48, the back plate 22 has a plurality of bolt holes 50, two of which are positioned proximate the top sidewall 24b, and the remainder of which are positioned near the other sidewalls. These latter bolt holes can be used for repositioning the cable clamps 42, for adding more and/or different cable clamps (see FIG. 2C), and/or for surface mounting the outlet box 20 (of course, other fastener apertures may be provided in the back plate 22 for surface mounting the outlet box).

Device, equipment, and/or cable ground wires can be attached to the box by way of the interior bolts or studs 48. Again, this eliminates the problem of ground connection screws extending past the back of the box. A screw and box type wire clamp for multiple ground wires can also be used.

While four cable access ports are shown on the top sidewall 24b in FIG. 1D, the outlet box 20 can have cable access ports 28 on more than one sidewall 24a–24d. In fact, the box 20 could have one or more cable access ports 28 on each of two, three, or even all four sidewalls (and the back plate), with cable clamps, as shown in FIG. 2C, or without. Further, the outlet box 20 could have two cable access ports 28 on one or more sidewalls, offset to one side, and equipped with various conduit knockouts 40 as described above. Also, conduit knockouts 40 could be provided in line with the cable access ports 28. In each of these configurations, the box 20 could be made deeper, if necessary, to accommodate the desired configuration, due to the lack of screws projecting from the back side.

For facilitating rapid attachment of the outlet box 20 to a stud, the top and bottom sidewalls 24b, 24d, as well as the left and right sidewalls 24a, 24c, have aligning guide holes 30a, 30b and fastener apertures 32a, 32b. In particular, the top and left sidewalls 24b, 24a each have two fastener guide holes 30a, 30b, which are wide enough to pass both a fastener (e.g., a screw 36) and a drive bit 52 (see FIG. 3), or just the drive bit for large head screws. The sides opposite these two sidewalls—the bottom and right sidewalls 24d, 24c, respectively—each have two smaller fastener apertures 32a, 32b which align with the respective guide holes 30a, 30b. The fastener apertures 32a, 32b are wide enough to pass the shaft portion of the fastener 36, but are too narrow to pass the drive bit 52. Also, the guide holes and fastener apertures are positioned towards the front of the box and away from the cable access ports 28 and clamps 42, to ensure that the cable clamps 42 do not obstruct the mounting holes.

To attach the outlet box 20 to a stud 34, the outlet box is aligned as desired, e.g., by score marks on the box side, with the bottom sidewall 24d or right sidewall 24c against the stud, as shown in FIGS. 2A–2C and 3. Then, a screw 36 (a standard screw, or, for metal studs, a metal stud self-tapping/ self-drilling screw) is affixed to the end of an appropriately long drive bit 52, e.g., of an electric screwdriver or drill 37. Next, both are passed through the first guide hole 30a until the tip of the screw passes through the first fastener aperture 32a that aligns with the first guide hole (see FIG. 3). The screwdriver or drill is then used to quickly drill the screw into the stud. Since the fastener aperture 32a is wide enough to pass the screw shank but not the screw head or drive bit 52, the screw tightens up against the right sidewall 24c, thereby holding the box against the stud. The process is quickly repeated for the remaining guide hole/fastener aperture pair 30b, 32b.

Because the mounting hole pattern (guide holes and fastener apertures) is repeated on both pairs of opposing sidewalls (top and bottom sidewalls 24b, 24d, and left and right sidewalls 24a, 24c), the outlet box 20 can be mounted to the right or left side of a stud by rotating the box in 90° increments, with the sidewall with the cable access ports always being accessible. For example, FIG. 2A shows the outlet box 20 mounted to the left side of a stud 34. In this position, cables 44 can be routed to the top sidewall 24b, while ½ conduits (or the like) can be routed to either the top, left side, or bottom. Thus, conduits that approach the box 20 from any direction can be easily accommodated without bending or rerouting. Having both the conduits and cables enter the same side makes wiring much neater and easier, and is preferred by electricians.

Figure 2B:
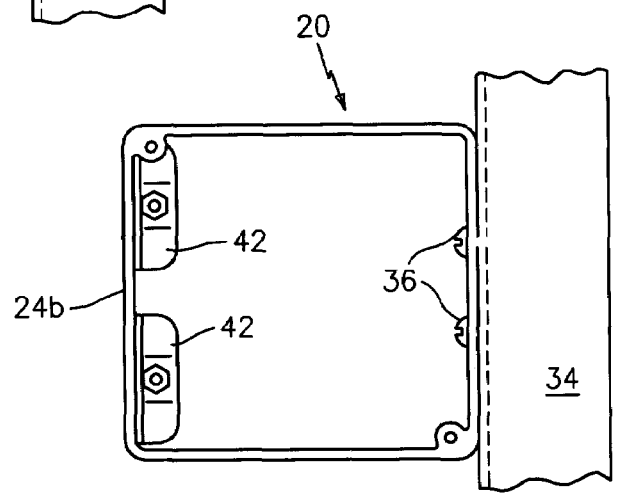
Figure 2C:
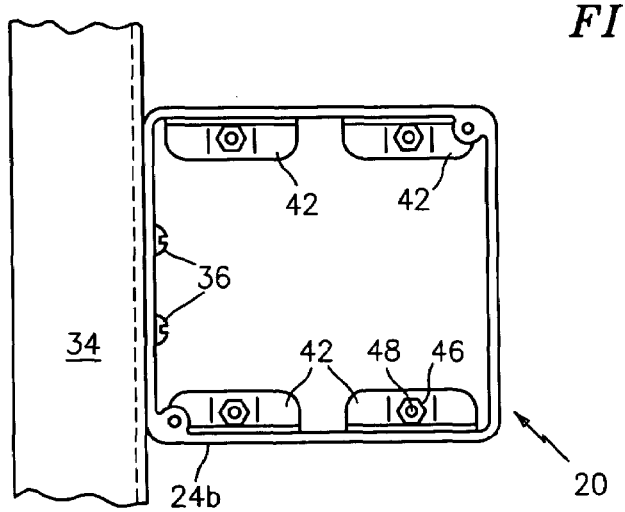
Figure 3:
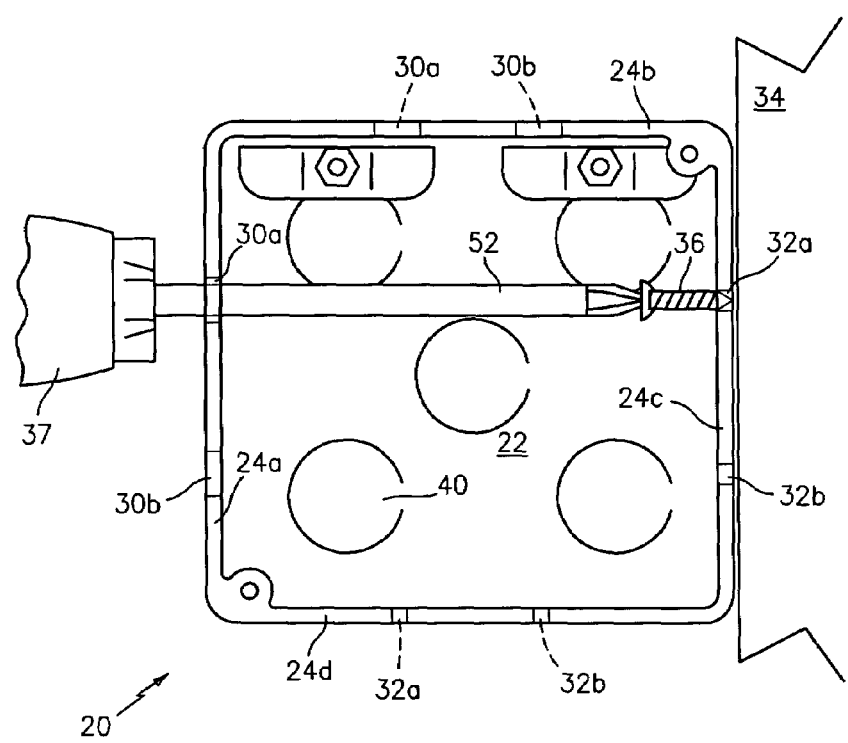
FIG. 3 is a front plan view of the electrical outlet box shown in FIGS. 1A–2C, showing how the box is rapidly attached to a stud, using an oversize hole as a guide.

FIGS. 2B & 2C show the outlet box 20 in different positions (without cables 44). In FIG. 2B, the box 20 has been rotated by 90° from the position shown in FIG. 2A, and is attached to the stud by way of the mounting hole pattern on the other pair of opposing sidewalls. Here, four cables 44 can be routed to what is now the left side of the box (the top sidewall 24b), while ½" conduits can enter the top, bottom, or even the side of the box. This provides a critical degree of flexibility for many real-world applications, and reduces the amount of time needed to route cables and conduit to an outlet or junction box. Also, in FIG. 2C, the box has been rotated by 90° from the position shown in FIG. 2B, and is attached to the right side of a stud 34. (As should be appreciated, in FIG. 2C the box has been provided with two additional cable clamps 42.) Again, four cables 44 can be routed to the cable access ports 28, while ½" conduits can enter the top, bottom, or side of the outlet box.

FIGS. 4A–4D & 5 show a second preferred embodiment of a rapid mounting, "square" electrical outlet box 60. This electrical box 60 comprises a back plate 62 and four upstanding sidewalls 64a-64d (again, referred to as "left" and "right" sidewalls 64a, 64c, and "top" and "bottom" sidewalls 64b, 64d, respectively) attached to the back plate 62 and defining a front opening 65. The top and bottom sidewalls 64b, 64d each have four cable access ports 28 (through-holes or knockouts), which allow entry of up to four AC, MC, or NM cables through each sidewall. Additionally, the back plate and sidewalls have a number of conduit knockouts, e.g., each sidewall 64a-64d has three knockouts 40, while the back plate 62 has five knockouts 40. Although a mix of sizes is shown in the drawings, to facilitate use with different sizes of conduit, the knockouts can be the same size.

To attach suitable cable clamps (not shown) to the outside of the box, the box 60 may be provided with optional clamp flanges or shelves 66a, 66b, which are flat metal landings or plates attached to the back plate 62 and extending down along and past the rear edges of the top and bottom sidewalls 64b, 64d, i.e., proximate the exterior sides of the cable access ports 28. In use, cable clamps would be attached to the clamp flanges via nuts and bolts, or welded studs (as facilitated by the appropriately-positioned holes 68 in the flanges 66a, 66b), and any cables extending into the cable ports 28 would be clamped into place.

For attaching the outlet box 60 to a wood or metal beam or stud, each sidewall has two sets of guide hole/fastener aperture pairs, each of which comprises a guide hole 70 next to a fastener aperture 72. The guide holes 70 and fastener apertures 72 are positioned so that each guide hole 70 aligns with a fastener aperture 72 on the opposite sidewall. For example, with reference to FIG. 5, the "rightmost" guide hole 70 on the top sidewall 64b aligns with the rightmost fastener aperture 72 on the bottom sidewall 64d, while the rightmost fastener aperture 72 on the top sidewall 64b Oust to the left of the rightmost guide hole 70) aligns with the rightmost guide hole 70 on the bottom sidewall 64d. This allows the outlet box to be rapidly attached to a stud by any one of its four sidewalls, akin to the method shown in FIG. 3.

Figure 6:
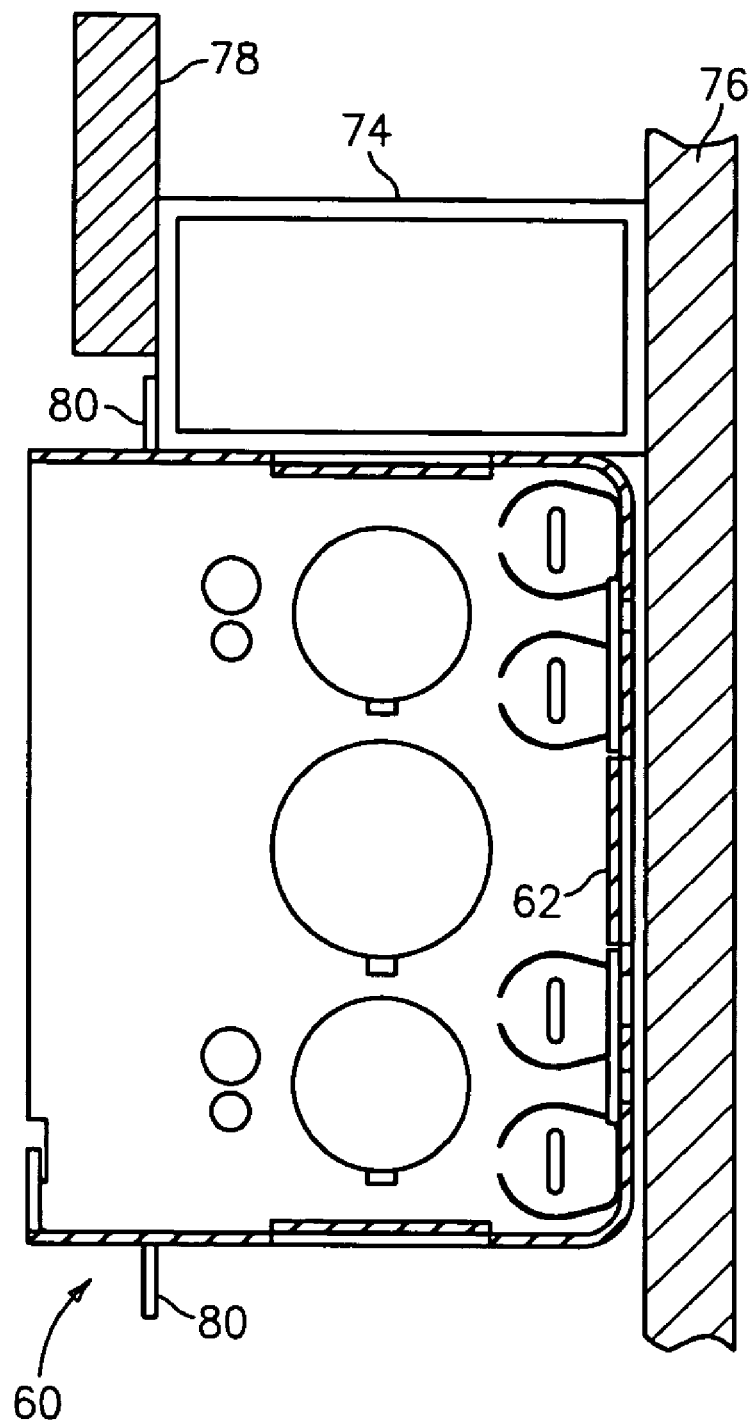
FIG. 6 is a top view of the electrical outlet box shown in FIG. 5, as installed.

FIG. 6 shows an example of how the outlet box 60 is positioned for one type of installation. Here, the outlet box 60 is attached to a metal stud 74, which extends between a rear wall portion 76 and a front wall portion 78. The outlet box sidewalls 64a-64d are about 3" deep, so that the outlet box fills most of the space between the wall portions 76, 78 ("full depth"), except for a small clearance between the back plate 62 and the rear wall portion 76. For setting the depth of the outlet box (i.e., to facilitate placement of the outlet box 60 against the metal stud 74), the outlet box 60 may have a plurality of fold-out depth tangs 80 in the left and right sidewalls 64a, 64c proximate the box's front opening 65, or scored marks for universal fit.

During manufacturing, the tangs are formed (stamped out) to be flat and unfolded. For use, the tangs 80 are simply folded outwards using a pliers or similar tool. The tangs 80 are sized and positioned so that when unfolded, and the box is then placed against a stud 74 with the rear side of the tangs against the front of the stud (see FIG. 6), the box is at the correct depth for the particular type of installation. Typically, the distance between the front edge of the box 60 and the back of the tang will be about 0.5–0.7 inches (preferably around 0.63"), which accounts for the typical thickness of drywall (⅝") or plaster (at least ½"). Of course, the tangs 80 may be shallower or deeper, depending on the installation, or the box may be provided with a group of tangs at one depth, and one or more additional groups at different depths (i.e., a user would select the appropriate group for the particular type of installation). The tangs 80 may be provided already folded outwards, or they may be separate L-shaped members attached to the box sidewalls at appropriate locations.

Instead of the tangs 80, index marks (not shown) may be used for gauging installation depth. Such marks would comprise small indicia or ruled lines positioned at the same depth as the "bottoms" of the tangs 80, which would then be used for visual alignment and placement with respect to a wall stud.

For attaching cable clamps and/or ground wires, or for surface mounting the outlet box 60, the back plate 62 has a number of different fastener apertures (i.e., bolt or screw holes) extending through the back plate. These apertures can be located at a number of different positions, and can be provided in a number of different sizes.

Figure 4A:
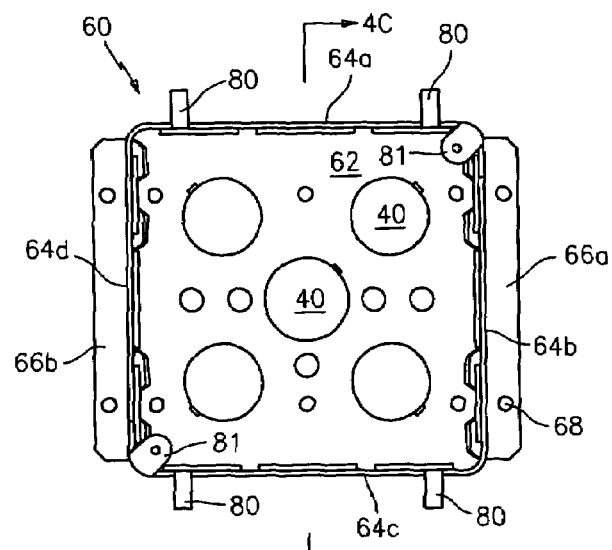
FIG. 4A is a front plan view of a second embodiment of an electrical outlet box according to the present invention, showing an interior of the outlet box.
Figure 4B:
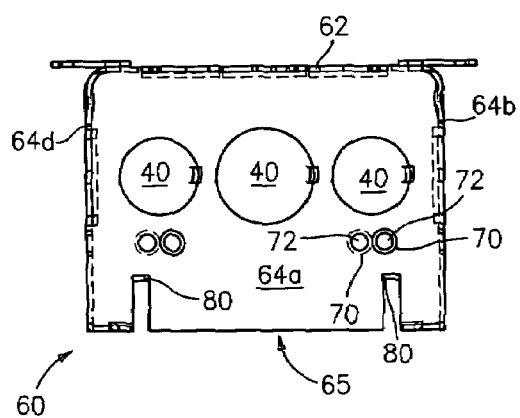
FIG. 4B is a top plan view of the electrical outlet box shown in FIG. 4A.
Figure 4C:
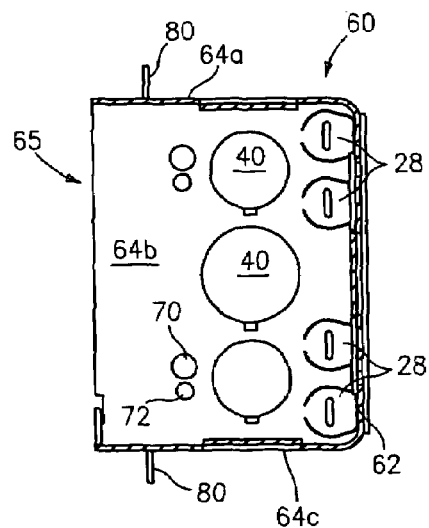
Figure 4D:
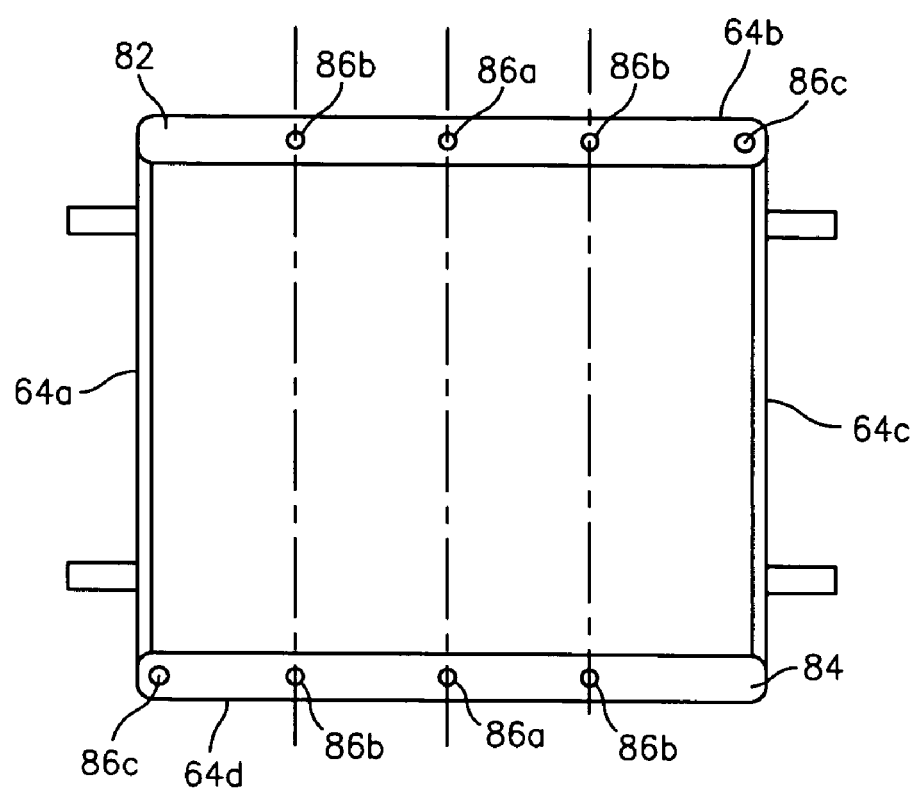
FIG. 4D shows an alternative means for outfitting the outlet box with a plurality of device connection bolt patterns.
Figure 5:
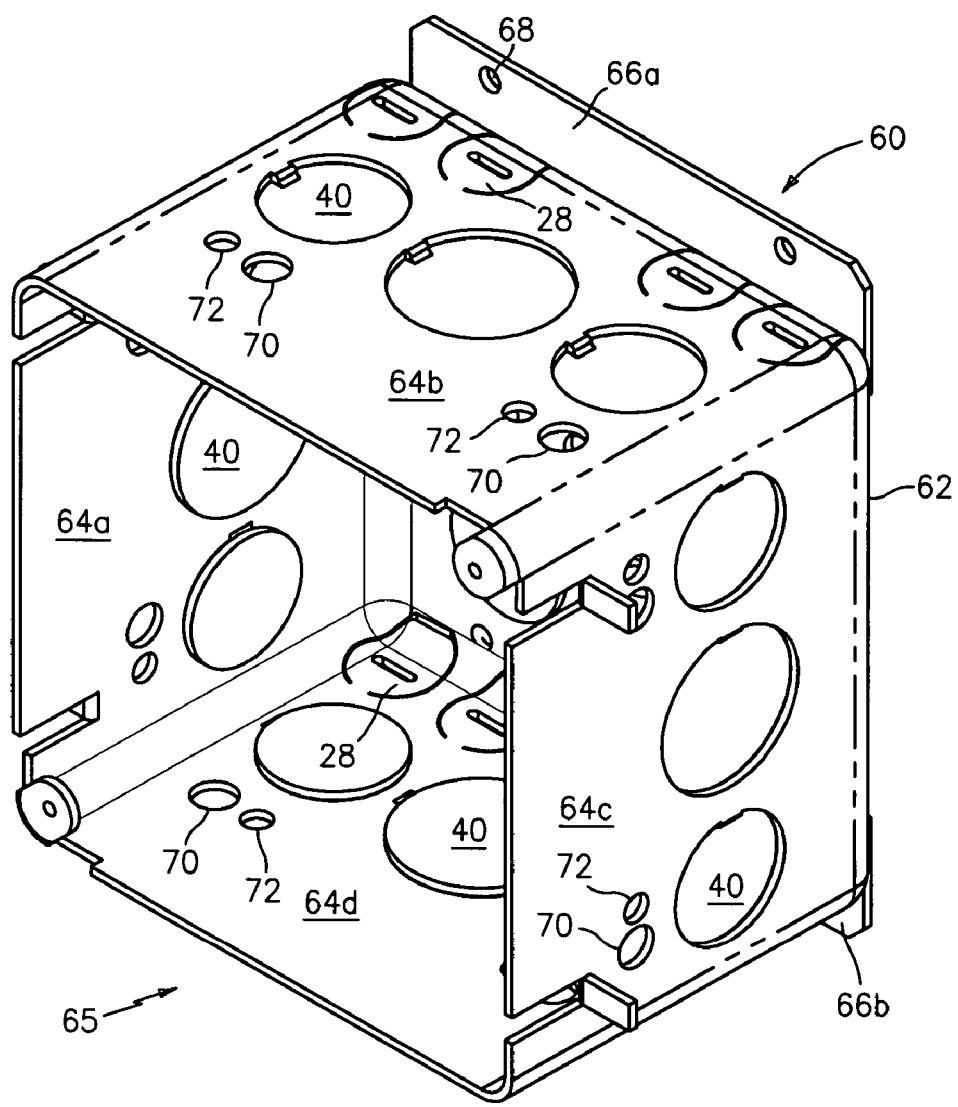
FIG. 5 is a perspective view of the electrical outlet box shown in FIGS. 4A–4C.

For connecting electrical devices, the outlet box 60 may have two standard 4" square bolt patterns comprising two apertured flanges 81 on opposite sides of the box at the ends of the sidewalls (like FIG. 1A), as shown in FIGS. 4A and 5. However, as shown in FIG. 4D, the box may instead have upper and lower device connection flanges 82, 84, respectively. The upper device connection flange 82 is a narrow, flat, metal piece extending across the top of the front opening 65 between the left and right sidewalls 64a, 64c and connected to the top sidewall 64b. The lower connection flange 84 is similarly positioned with respect to the bottom of the box. The flanges 82, 84 have complementary device connection bolt patterns 86a, 86b, 86c, wherein bolt pattern 86a is suited for connecting "1-gang" devices, bolt pattern 86b is suited for connected "2-gang" devices, and bolt pattern 86c is suited for connecting 4" square-type devices. Alternatively, the outlet box 60 could have a different "stand alone" bolt pattern, or the flanges 82, 84 could have bolt patterns other than those shown in FIG. 4D.

In addition to the methods described above, FIGS. 7A–9 show various means for attaching one or more ground wires to the outlet box 20, 60, for purposes of electrically grounding the box. As contemplated herein, the ground wires can be the ground cables or wires reaching the outlet box from the particular building's wiring (e.g., certain cables have "built-in" ground wires along with one or more primary conductor wires, or there may be separately-run sections of ground wiring extending throughout a particular building), or they can be separate sections of ground wire pre-attached to the box for rapidly attaching to the building's ground wiring via a wire nut or other suitable connector (i.e., the methods shown herein are generally suitable for pre-attaching ground wires or for attaching wires "on the fly").

In FIG. 7A, a ground wire 90 is attached to the outlet box wall 92 (back plate or side wall) by way of a "box" type ground lug 94, or the equivalent, fastened to the wall 92 by a screw, rivet, or press fit. As shown in FIG. 7B, the ground lug can be formed into the box wall 92 by deforming the box wall when the outlet box is stamped. One or two (or more) of such lugs 94 can be provided in different places, and the lugs 94 should be large enough to accommodate from one to six #12 wires.

As shown in FIG. 7C, the ground wire 90 can be electrically attached to the box wall 92 by spot welding the wire to the wall 92 via a weld 96, or via a crimp-type lug on the wire that is welded to the box.

As shown in FIGS. 8A–8C, ground wires 90 can be electrically attached to the outlet box via a dual ground clamp 98a, 98b attached to the back plate 22, 62. In FIG. 8B, the dual ground clamp 98a is a dual box-type lug attached to the box by way of a nut and bolt and capable of holding up to six #12 wires per wire opening. In FIG. 8C, the dual ground clamp 98b has clamps on folded-down "ears" outside the box, or welded on. The clamps are suitable for both AC/MC and NM cabling.

FIG. 9 shows another arrangement for grounding the outlet box. Here, one or more flying ground leads 100 (in the form of solid, 12-gauge, bare wires, or other suitable types of wire) are spot welded or otherwise permanently attached to the box exterior, in addition to, or instead of, screw/nut clamp(s) 102 (here, the clamp 102 could be used for connecting the ground terminal from an electrical outlet or other electrical device to the outlet box). "Romex" or MC cables can be quickly electrically attached to the box by connecting their grounds to the flying ground lead(s) via wire nuts.

Figure 10:
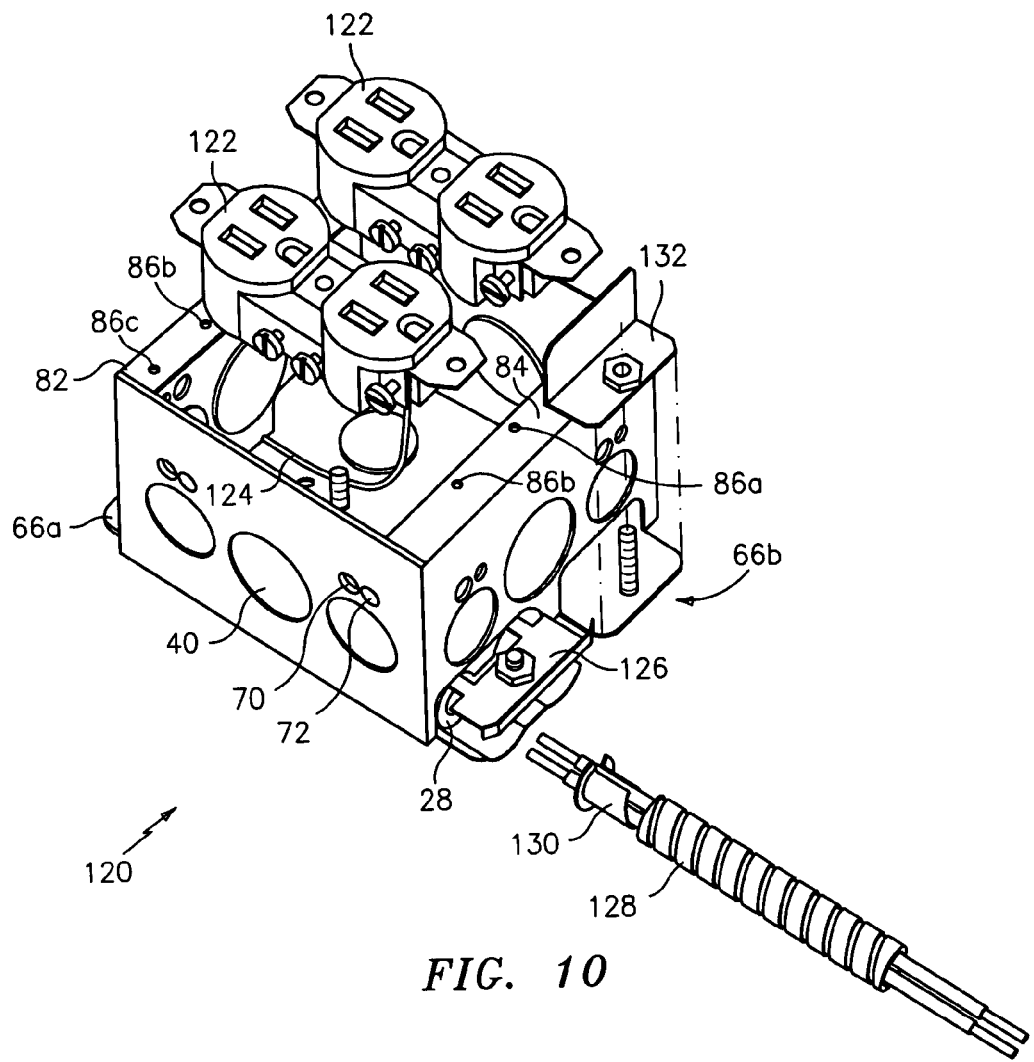
FIG. 10 is a perspective view of an alternative embodiment of the outlet box according to the present invention.

FIG. 10 shows an additional embodiment 120 of the outlet box (in conjunction with two electrical devices 122). Here, the outlet box 120 is a square, full-depth, metal box having various conduit knockouts 40, the mounting hole pairs 70, 72, and the upper and lower device connection flanges 82, 84, with the complementary device connection bolt patterns 86a, 86b, 86c therein. A ground lead 124 is electrically connected to the rear wall of the outlet box, via a spot weld or bolt, for rapidly electrically connecting the electrical device grounds (or ground wires from other sources) to the outlet box. In addition, the box 120 has the clamp shelves 66a, 66b located proximate one or more cable access ports 28, plus one or more external BX/RX clamps 126 attached to the clamp shelves and projecting slightly inside the box 120. The BX/RX clamps 126 allow AC, MC, and BX cables 128 (typically in conjunction anti-short bushings 130) to be rapidly connected to the outlet box (through the cable access ports). A clamp cover 132 may be provided as part of the clamps 126 if required by the UL (Underwriters Laboratory).

Figure 11:
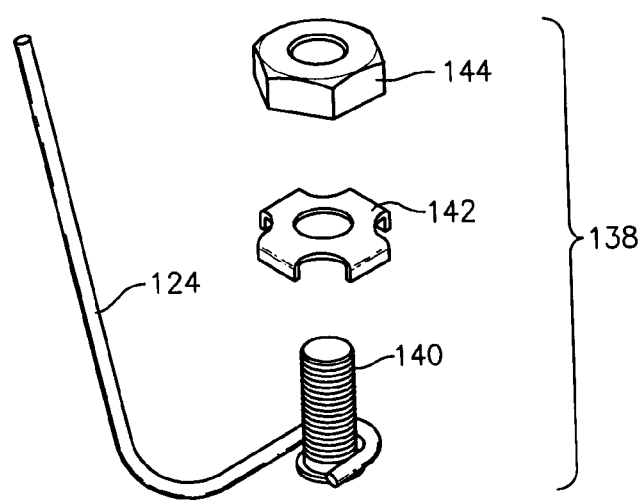
FIG. 11 is a perspective exploded view of a mechanism for attaching a ground lead to the outlet box.

FIG. 11 is a detailed view of a bolt-based mechanism 138 for mechanically electrically attaching a ground lead 124 to an outlet box. Here, a bolt or welded stud 140 projects through the rear of the outlet box (or a sidewall) into the interior of the outlet box, around the base of which the lead 124 is wrapped. A flanged retaining washer 142 fits over the bolt, and helps to secure the lead in place. Finally, a nut 144 is screwed down onto the bolt and is tightened against the washer 142, to complete the attachment.

Figure 12A:
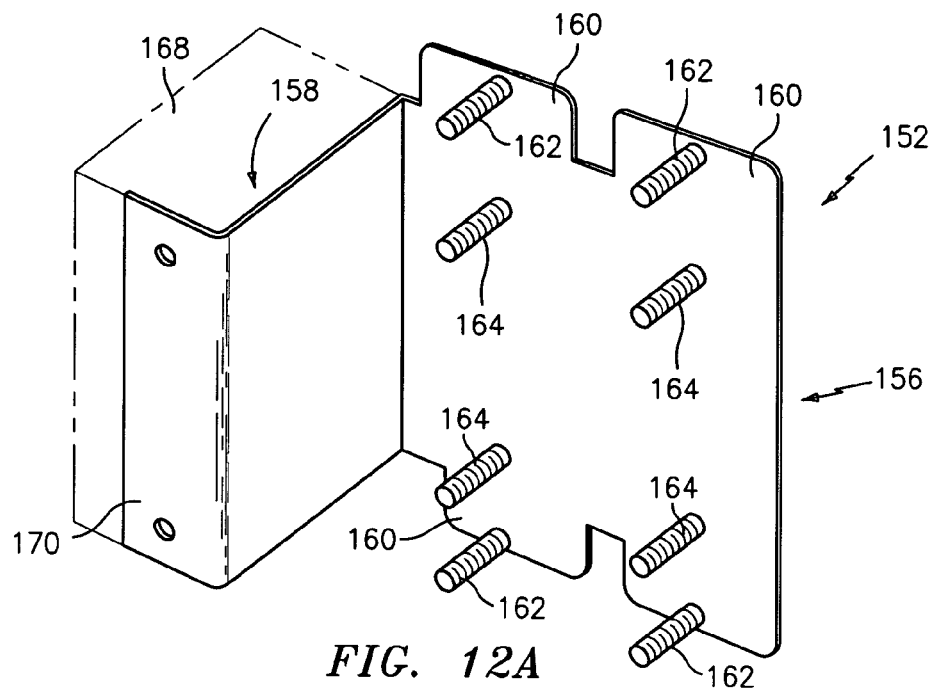
FIGS. 12A–12C & 13 are perspective views of various plastic/metal composite embodiments of the present invention.
Figure 12B:
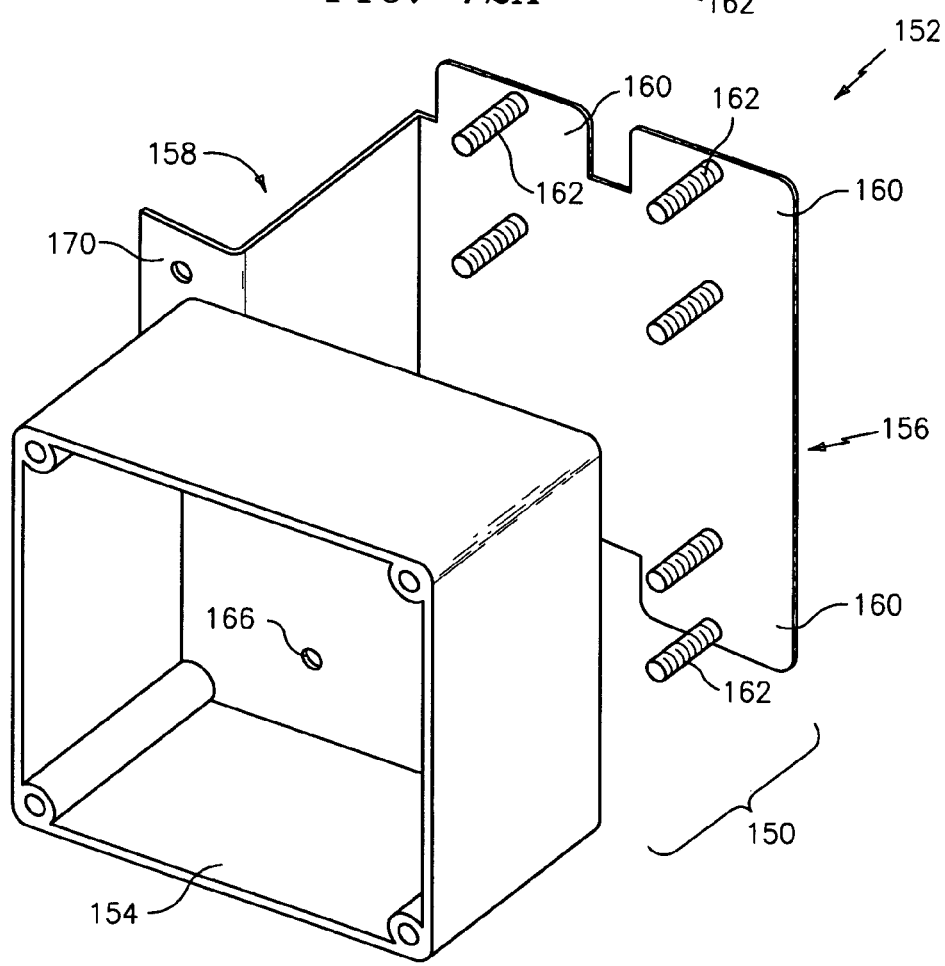
Figure 12C:
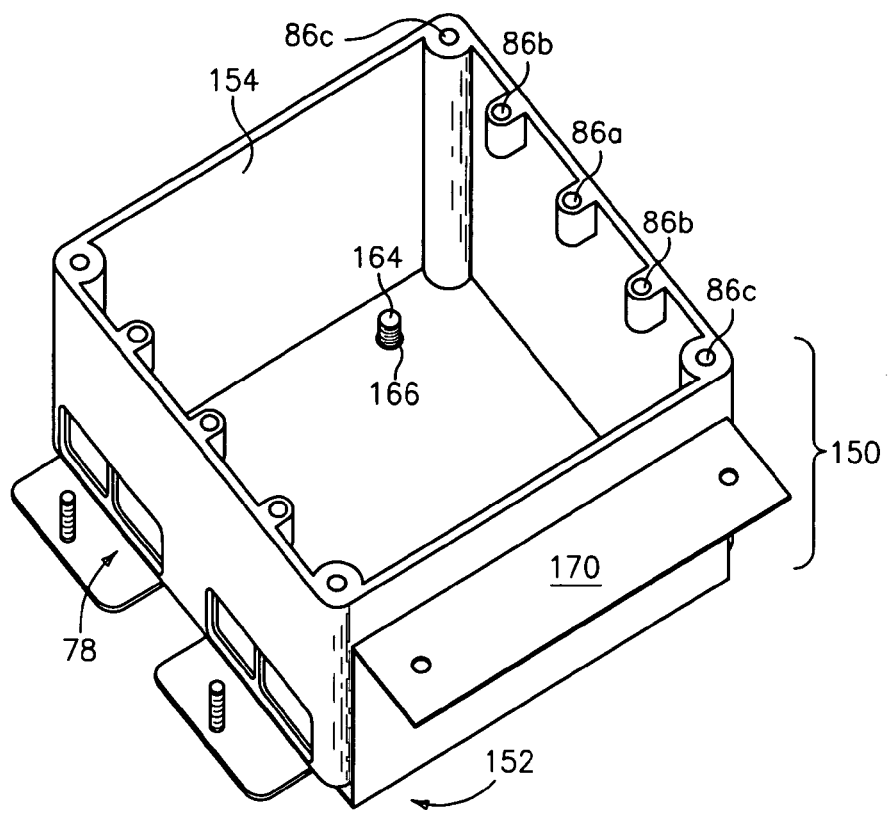

FIGS. 12A–12C show a plastic/metal composite or compound electrical outlet box 150, which facilitates the use of metal armored cable with a plastic box. The composite box 150 includes a metal mounting bracket 152 and a molded, plastic box portion 154. The mounting bracket 152 comprises a rear plate portion 156 and a folded flange 158 ("stud connection" means for connection the bracket to a stud) attached to one side of the rear plate 156. The rear plate 156 includes various clamp extensions 160, upstanding, threaded clamp posts 162, and upstanding, threaded box alignment/attachment posts 164. The plastic box 154 is a square, full-depth, one-piece, molded plastic box generally similar in overall size and shape to the boxes discussed above. The plastic box 154 has various cable access ports 28 extending through its sidewalls, the device connection bolt patterns 86a, 86b, 86c, and one or more rear attachment holes 166 for admitting the box alignment/attachment posts 164 (some of these features are not shown in FIG. 12B).

In use, the mounting bracket 152 is attached to the front face of a stud 168, as indicated in FIG. 12A, by resting the bracket 152 against the front and side of the stud 168, and then driving one or more standard fasteners (not shown) through a leading, folded-back portion 170 of the flange 158 and into the stud. Of course, the folded flange 158 implies a set depth with respect to the stud 168, which is chosen for standard dimensions such that the rear plate 156 is located proximate the rear of the stud 168, and parallel to the stud's front side, once attached to the stud. Then, the box portion 154 is positioned onto the bracket 152, as shown in FIG. 12C, such that the upstanding threaded box alignment/attachment posts 164 extend through respective, aligned rear attachment holes 166 in the box portion 154, holding the box in place. As should be appreciated, the box portion 154 is dimensioned to extend past the front side of the stud 168 when attached to the bracket 152, such that the front of the box portion 154 is flush (or thereabouts, depending on the particular application) with the wall finish/drywall. Finally, nuts (not shown) are screwed down onto the posts 164, to secure the box in place against the bracket, and cables, electrical devices, etc. are routed to and/or connected to the box portion 154 as described in the sections above. The posts 164 may be used as locations for connecting device or cable ground wires using, e.g., the mechanism shown in FIG. 11. Metallic spacers (not shown) may be used to avoid clamping into plastic. This configuration allows BX, AC, and MC cables to be used with a plastic box portion, which is advantageous in certain situations (along with, of course, the advantages of quick mounting, a "full-depth" box, multiple connection patterns, etc., as provided by the outlet box design generally).

In addition to connecting the bracket and box together as described above, the bracket 152 and plastic box portion 154 may be provided as "snap-together" modules, or they may come preassembled, connected together via rivets or the like. In either case, one or more of the posts 164, with metallic spacer(s), would extend into the interior of the box 154 for attaching cable or electrical device ground wires.

Figure 13:
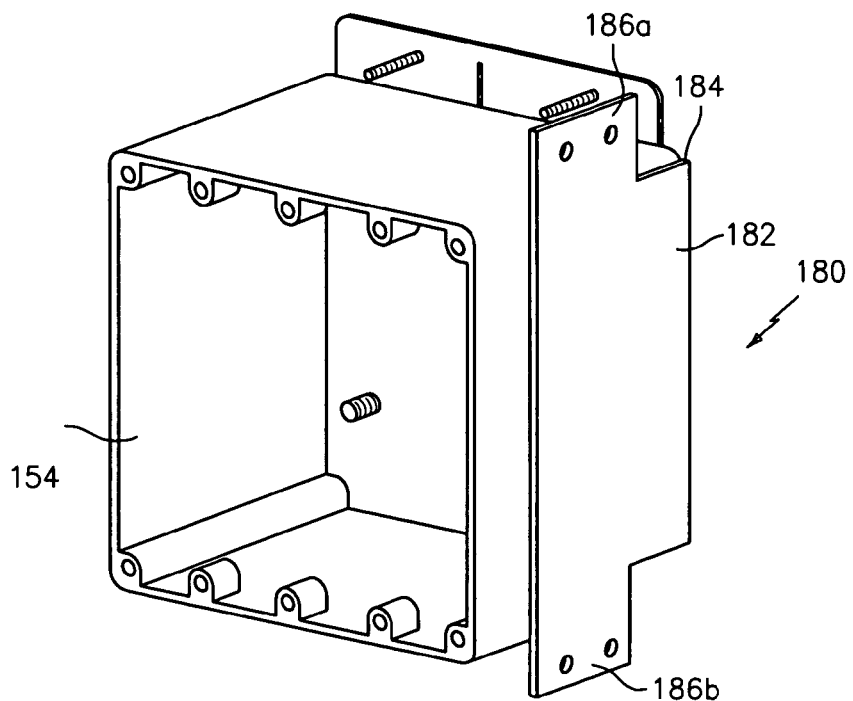

FIG. 13 shows an alternative embodiment 180 of the metal mounting bracket. Here, instead of the bracket 180 having a stud connection means in the form of a folded flange 158 with a leading, folded-back portion 170, the stud connection means is a side mounting plate 182. The side mounting plate 182 is attached to the bracket's rear plate portion 184 at a right angle, and includes upper and lower wings 186a, 186b. The wings allow the bracket 180 to be mounted to the side of a stud (metal or otherwise) at any depth.

Figure 14A:
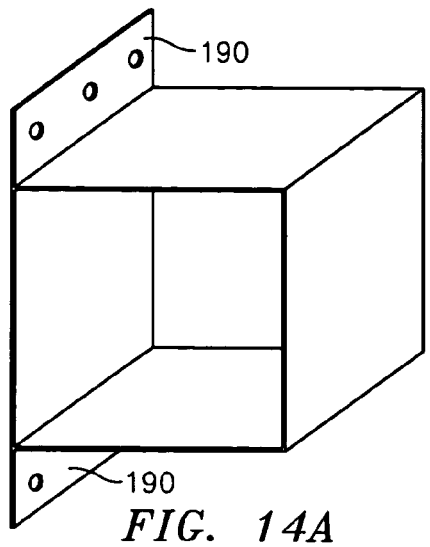
FIGS. 14A and 14B show an embodiment of the outlet box with side "ears" or preset mounting flaps.
Figure 14B:
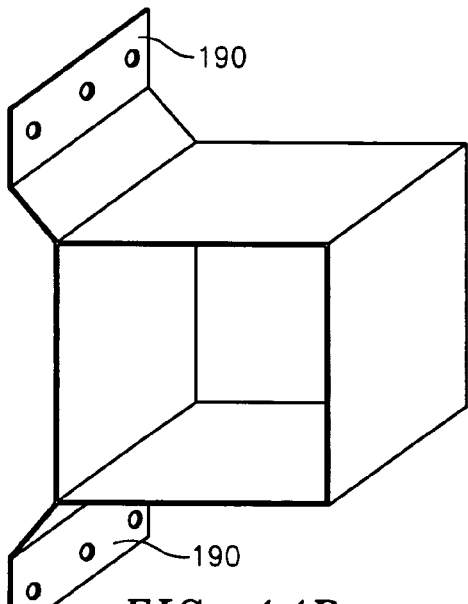

As shown in FIGS. 14A and 14B, optionally, any of the aforementioned outlet boxes may be provided with standard mounting "ears" or preset mounting flaps 190, i.e., ½" to ⅝" for drywall, for allowing the boxes to be attached to studs in different manners or configurations. These may be "flat," as shown in FIG. 14A, or offset, as shown in FIG. 14B.

Figure 15:
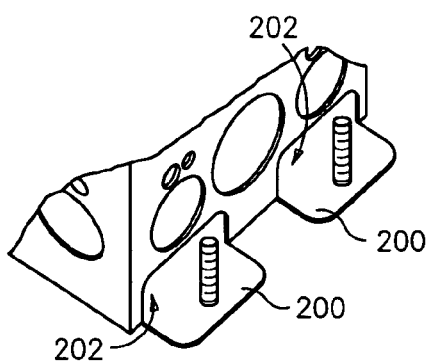
FIG. 15 is a perspective view of an alternate means for providing cable through-ways and clamp shelves on the outlet box.

FIG. 15 shows an alternative means for forming cable through-ways in the outlet box. Here, instead of having cable access ports 28 and separate clamp shelves 66, clamps flanges or shelves 200 are formed by appropriately stamping the outlet box sidewalls (i.e., a U-shaped stamp) and then folding the stamped portions down and outwards. At the same time, this forms openings 202 in the box sidewall, through which cables can be routed.

Figure 16A:
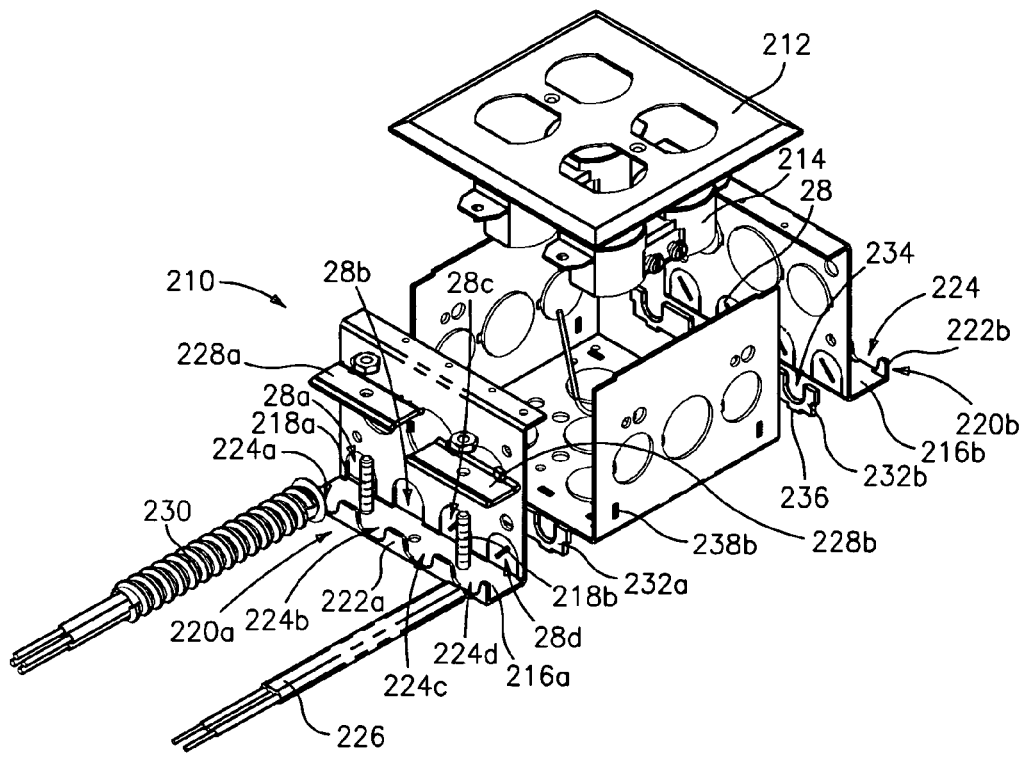
FIG. 16A is a perspective, exploded view of a first additional embodiment of the outlet box that includes clamp shelves with retainer/locating lips and two interior stop plates.
Figure 16B:
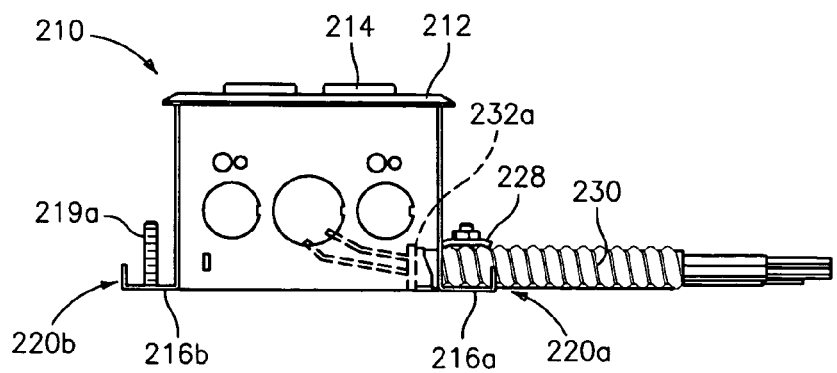
FIG. 16B is a side elevation view of the outlet box of FIG. 16A.

FIGS. 16A–16C show an additional embodiment of an outlet box 210 according to the present invention. The outlet box 210 (shown in use with a standard cover 212 and electrical devices 214 for context) is generally similar to the outlet boxes described above. However, the outlet box 210 also includes two external clamp shelves 216a, 216b, which are located near the rear of the outlet box 210 and perpendicular to the sidewalls, i.e., they are positioned near the cable access ports 28. Each clamp shelf 216a, 216b includes two upstanding, threaded clamp posts 218a, 218b as well as a forwards-facing retainer/locating lip 220a, 220b for holding cables in place. More specifically, the retainer/locating lips 220a, 220b are perpendicular to the clamp shelves 216a, 216b, and include a series of sloped protuberances 222 that define flat-bottomed, generally U-shaped spaces 224 between them, one for each cable access port 28.

In use with generally-flat, plastic-jacket or Romex cable 226, the cable 226 is simply positioned in and through one of the U-shaped spaces 224 and that space's corresponding/aligning cable access port 28. As should be appreciated, since the spaces 224 are flat-bottomed, the cable 226 is not damaged when the clamp covers 228 are tightened, i.e., if a cable rests on metal edges, the edges tend to dig into the cable installation when the clamp covers are tightened. It should also be noted that the cable access ports 28 have flat bottoms for this same reason. In use with BX/sheathed cable 230, as best shown in FIG. 16B, the cable sheathing rests between two consecutive lip protuberances 222, which helps to hold the cable 230 in place when the clamps are tightened, especially against lateral movement. This is also true for Romex/flat cable, where the protuberances 222 help to keep the cable in place.

FIGS. 16A and 16C show optional insulated stop plates 232a, 232b for use with the outlet box 210. Each insulated stop plate 232a, 232b is rectangular in overall shape (i.e., shaped like a generally-rectangular, flat strip), but with a series of U-shaped spaces or cutouts 234 along its length. The U-shaped cutouts 234 are spaced apart the same as the cable access ports 28, so that when the stop plates 232a, 232b are positioned cross-wise in the interior of the outlet box 210, against the back plate and parallel and proximate to the cable access ports 28, the U-shaped cutouts 234 respectively align with the cable access ports 28. The stop plates 232a, 232b are made from a non-conducting material such as plastic, and may be attached to the outlet box 210 in a conventional manner, e.g., by way of tabs 236 and slots 238 in the sidewalls.

In use, the stop plates 232a, 232b are attached to the interior of the outlet box 210 parallel and proximate to the cable access ports. When the cables 226, 230 are inserted through the cable access ports 28, the cables' insulators/sheathes come into contact with the stop plates 232a, 232b, preventing the cables from further extending into the outlet box while allowing the cables' wires to extend through the U-shaped cutouts 234 (see FIG. 16B). This helps to retain any "red head" cable bushings, and provides another point for securing the cables in place. In particular, with the cables: (i) being secured by the retainer/locating lips 220a, 220b; (ii) held by the clamp covers 228; (iii) extending through the cable access ports 28; and (iv) abutting the stop plates 232a, 232b (with the cables' wires extending through and past the U-shaped cutouts 234), the cables are in effect held at least three different points. This makes it very difficult to dislodge or loosen the cables, both when they are pulled directly outwards or moved laterally.

Figure 17B:
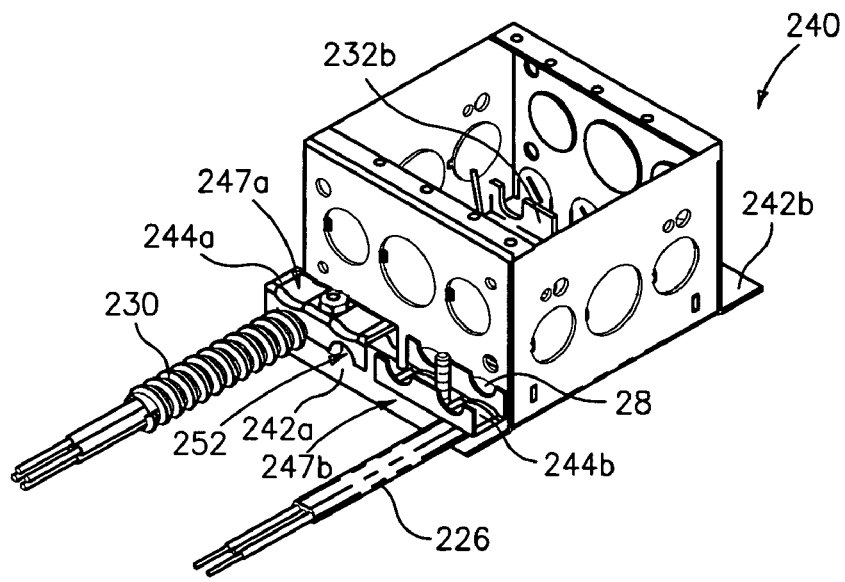
FIG. 17B is a perspective, non-exploded view of the outlet box shown in FIG. 17A.
Figure 17A:
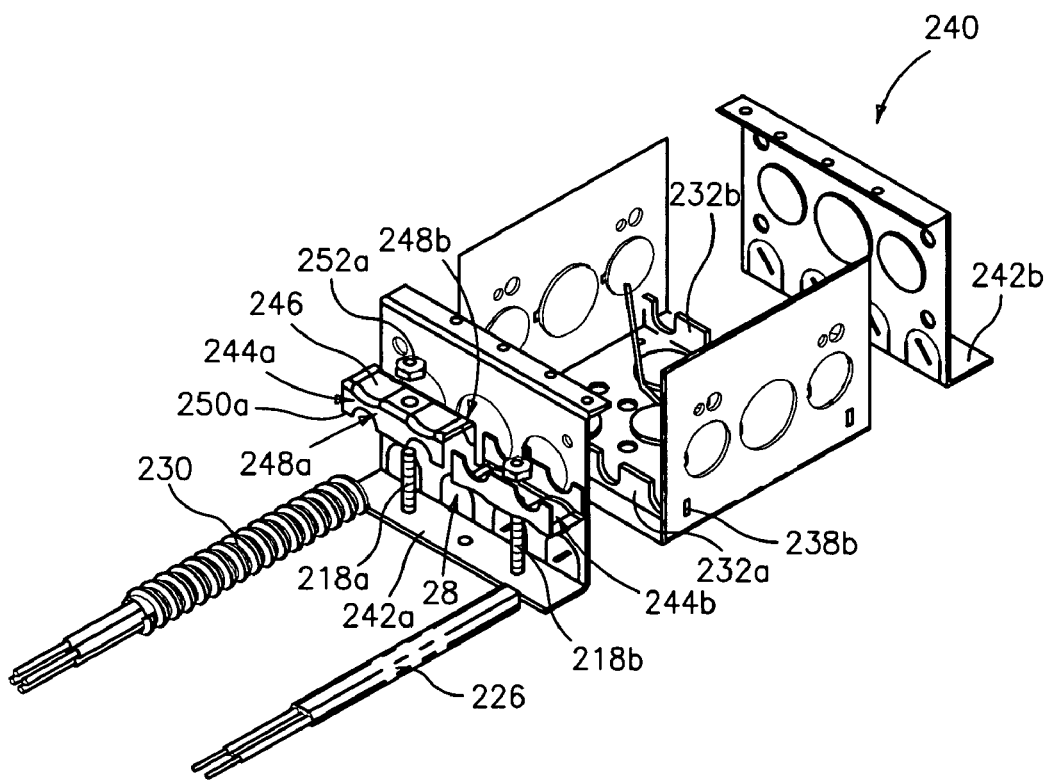
FIG. 17A is a perspective, exploded view of a second additional embodiment of the outlet box that includes the interior stop plates, flat clamp shelves, and reversible clamp covers.

FIGS. 17A–17C show an additional outlet box 240. The outlet box 240 is generally similar to the outlet box 210 shown in FIGS. 16A–16B, but has flat clamp shelves 242a, 242b, i.e., clamp shelves without the retainer/locating lips 220a, 220b. Instead, the outlet box 240 includes reversible clamp covers 244a, 244b, each of which has a first side 246 with two slightly-concave grooves suitable for holding plastic-jacket cable, and a second, opposite side 248 having a retainer/locating lip 250 (similar in shape to the retainer/locating lips 220a, 220b) for holding sheathed cable. In use, as shown in FIG. 17B, for clamping plastic-jacket cable 226 the first side 246 is selected and positioned to contact the cable 226. If sheathed cable 230 is used, the clamp cover is flipped over. When tightened, the retainer/locating lip 250 engages the cable sheathing, as shown in FIGS. 17B and 17C.

Each aforementioned embodiment of the outlet box is made of metal, plastic, or any other suitable material (for most applications the box will be metal), and can be manufactured according to standard methods, as are generally known in the art. For example, the box can be injection or cast molded, or it can be formed out of a stamped sheet of metal, with the sidewalls being bent and affixed to one another via tabs and slots or the like.

The conduit knockouts (of various sizes and types) and cable access ports can be characterized together as defining an "access entry pattern." That is, on each sidewall the conduit knockouts and cable access ports form a pattern of potential entryways for conduit and/or cable to enter the outlet box. Thus, for the embodiments described above, some of the sidewalls would have access entry patterns comprising one or more conduit knockouts and a plurality of cable access ports. However, it should be appreciated that the outlet box could be provided with just conduit knockouts, of various types as desired, for conduit-only work. In this case, the outlet box would be characterized as each sidewall having an access entry pattern "consisting of" one or more conduit knockouts, i.e., the conduit knockouts and nothing else.

As should be appreciated, the outlet box can be provided with any of a number of different, standard cable clamps, as are commonly commercially available. Further, instead of having multiple instances of a single type of clamp, the box could have a mix of cable clamps. Also, it should be noted that the outlet box allows for the cable clamps to be interchanged and/or repositioned as desired, depending on the particular application.

Although the outlet box of the present invention has been illustrated as being "square," it should be appreciated that an outlet box incorporating the inventive features described herein could be round, octagonal, etc. without departing from the spirit and scope of the invention. As such, the term "sidewall," as used herein, includes non-flat and/or rounded sidewalls, sidewalls having subsections that are bent or angled with respect to one another, and sidewalls that are not necessarily distinctly delineated from one another. For example, an octagonal outlet box could be characterized as having eight sidewalls (one for each side), or just four sidewalls (each comprising two adjacent sides). Additionally, a circular outlet box could be characterized as having a plurality of sidewalls, with the sidewalls being rounded, and, of course, generally integral with one another.

Since certain changes may be made in the above described rapid mounting, square electrical outlet box, without departing from the spirit and scope of the invention herein involved, it is intended that all of the subject matter of the above description or shown in the accompanying drawings shall be interpreted merely as examples illustrating the inventive concept herein and shall not be construed as limiting the invention.

Having thus described the invention, what is claimed is:

What is claimed is:

1. An outlet box comprising:
   a. a box frame comprising:
      i. a back plate; and
      ii. four sidewalls attached to the back plate and defining a front opening, wherein: each of said sidewalls has a plurality of conduit knockouts; and at least one of said sidewalls also has a plurality of cable access ports in addition to the conduit knockouts, wherein the cable access ports are located near the back plate; and
   b. a plurality of clamp shelves attached to the box frame proximate to the exterior sides of each plurality of cable access ports and to the back plate, wherein: the clamp shelves are generally perpendicular to the sidewalls; and the clamp shelves are adapted in size and shape for at least two reversible clamp covers to be attached to each clamp shelf, exteriorly to the box frame, wherein one of the clamp covers retains one type of cable and another of the clamp covers can retain selectively either the same type of cable or another cable, with the retained cables extending into the cable access ports in a clamped position, whereby the space available inside the box frame for making electrical connections is increased as a result of not having to accommodate one or more cable clamps inside the box frame.

2. The outlet box of claim 1 wherein the clamp shelves are flat, and the clamp shelves and back plate are coplanar.

3. The outlet box of claim 2 wherein the clamps shelves are flat, and the clamps shelves and back plate are a unitary, planar member.

4. The outlet box of claim 1 wherein the cable access ports each have a flat side aligned with the clamp shelves, wherein flat cables extending through the cable access ports can be positioned to rest against a flat surface defined by the clamp shelves, cable access port flat sides, and the back plate, to eliminate potential damage to the cables caused by tightening the cables against metal edges.

5. An outlet box comprising:
   a. a box frame comprising:
      i. A back plate: and
      ii. four sidewalls attached to the back plate and defining a front opening, wherein: each of said sidewalls has a plurality of conduit knockouts; and at least one of said sidewalls also has a plurality of cable access ports in addition to the conduit knockouts, wherein the cable access ports are located near the back plate: and
   b. a plurality of clamp shelves attached to the box frame proximate to the exterior sides of each plurality of cable access ports and to the back plate, wherein: the clamp shelves are generally perpendicular to the sidewalls; and the clamp shelves are adapted in size and shape for at least one cable clamp to be attached to each clamp shelf, exteriorly to the box frame, for holding cables extending into the cable access ports in a clamped position, whereby the space available inside the box frame for making electrical connections or the like is increased as a result of not having to accommodate one or more cable clamps inside the box frame; and
   c. at least one insulating stop plate attached to the interior of the outlet box parallel and proximate to the cable access ports, wherein the stop plate includes a plurality of U-shaped cutouts aligning with the cable access ports, whereby cables inserted through the cable access ports come into contact with the stop plate for preventing the cables from further extending into the outlet box while allowing wire portions of the cables to extend through the U-shaped cutouts, in order to further secure the cables and insulating cable bushings.

6. An outlet box comprising:
   a. a box frame comprising:
      i. a back plate: and
      ii. four sidewalls attached to the back plate and defining a front opening, wherein: each of said sidewalls has a plurality of conduit knockouts: and at least one of said sidewalls also has a plurality of cable access ports in addition to the conduit knockouts, wherein the cable access ports are located near the back plate: and
   b. a plurality of clamp shelves attached to the box frame proximate to the exterior sides of each plurality of cable access ports and to the back plate, wherein: the clamp shelves are generally perpendicular to the sidewalls; and the clamp shelves are adapted in size and shape for at least one cable clamp to be attached to each clamp shelf, exteriorly to the box frame, for holding cables extending into the cable access ports in a clamped position, whereby the space available inside the box frame for making electrical connections or the like is increased as a result of not having to accommodate one or more cable clamps inside the box frame; and
   c. wherein:
      i. the clamp shelves each include a forwards-facing retainer lip for holding cables in place;
      ii. the retainer lips are perpendicular to the clamp shelves; and
      iii. the retainer lips include a series of sloped protuberances that define flat-bottomed, generally U-shaped spaces between them, said U-shaped spaces aligning with the cable access ports, whereby cables extending through the U-shaped spaces and clamped into place are further prevented being removed or dislodged from lateral movement.

7. An outlet box comprising:
   a. a box frame comprising:
      i. a back plate; and
      ii. four sidewalls attached to the back plate and defining a front opening, wherein: each of said sidewalls has a plurality of conduit knockouts; and at least one of said sidewalls also has a plurality of cable access ports in addition to the conduit knockouts, wherein the cable access ports are located near the back plate; and
   b. a plurality of clamp shelves attached to the box frame proximate to the exterior sides of each plurality of cable access ports and to the back plate, wherein: the clamp shelves are generally perpendicular to the sidewalls; and the clamp shelves are adapted in size and shape for at least one cable clamp to be attached to each clamp shelf, exteriorly to the box frame, for holding cables extending into the cable access ports in a clamped position, whereby the space available inside the box frame for making electrical connections or the like is increased as a result of not having to accommodate one or more cable clamps inside the box frame; and c. a reversible clamp cover, wherein the reversible clamp cover has:
   i. a first side with a concave groove adapted in size and shape to hold generally-flat cable; and
   ii. a second side having a retainer lip adapted in size and shape to retain sheathed cable.

8. An outlet box comprising:
a. a box frame comprising:
   i. a back plate; and
   ii. four sidewalls attached to the back plate and defining a front opening wherein a first one of the sidewalls includes a plurality of cable access ports located proximate to the back plate; and
b. a clamp shelf attached to the box frame proximate to the exterior sides of the cable access ports and to the back plate; and
c. at least one insulating stop plate attached to the interior of the outlet box parallel and proximate to the cable access ports, wherein the stop plate includes a plurality of U-shaped cutouts aligning with the cable access ports, whereby cables inserted through the cable access ports come into contact with the stop plate for preventing the cables from further extending into the outlet box while allowing wire portions of the cables to extend through the U-shaped cutouts, in order to further secure the cables and insulating cable bushings.

9. The outlet box of claim 8 wherein the cable access ports each have a flat side aligned with the clamp shelf, wherein flat cables extending through the cable access ports can be positioned to rest against a flat surface defined by the clamp shelf, cable access port flat sides, and the back plate, to eliminate potential damage to the cables caused by tightening the cables against metal edges.

10. An outlet box comprising:
a. a box frame comprising:
   a back plate; and
   ii. four sidewalls attached to the back plate and defining a front opening; wherein a first one of the sidewalls includes a plurality of cable access ports located proximate to the back plate; and
b. a clamp shelf attached to the box frame proximate to the exterior sides of the cable access ports and to the back plate; and
c. wherein:
   i. the clamp shelf includes a forwards-facing retainer lip for holding cables in place;
   ii. the retainer lip is perpendicular to the clamp shelf; and
   iii. the retainer lip includes a series of sloped protuberances that define flat-bottomed, generally U-shaped spaces between them, said U-shaped spaces aligning with the cable access ports, whereby cables extending through the U-shaped spaces and clamped into place are further prevented being removed or dislodged from lateral movement.

11. An outlet box comprising:
a. a box frame comprising:
   i. a back plate; and
   ii. four sidewalls attached to the back plate and defining a front opening, wherein a first one of the sidewalls includes a plurality of cable access ports located proximate to the back plate; and
b. a clamp shelf attached to the box frame proximate to the exterior sides of the cable access ports and to the back plate; and
c. reversible clamp cover, wherein the reversible clamp cover has:
   i. a first side with a concave groove adapted in size and shape to hold generally-flat cable; and
   ii. a second side having a retainer lip adapted in size and shape to retain sheathed cable.

* * * * *

UNITED STATES PATENT AND TRADEMARK OFFICE
CERTIFICATE OF CORRECTION

PATENT NO.    : 6,979,779 B2
DATED         : December 27, 2005
INVENTOR(S)   : John K. Grady It is certified that error appears in the above-identified patent and that said Letters Patent is hereby corrected as shown below:

Title page,
Item [76], Inventor, change "111 Slough Rd." to -- 43 Slough Rd. --.

Column 5,
Line 21, change "1/2" to -- 1/2 --.

Column 6,
Line 55, change "1/2" to -- 1/2 --.

Column 7,
Line 47, change "Oust" to -- (just --.

Column 14,
Line 17, change "knockouts:" to -- knockouts; --.

Signed and Sealed this

Twenty-eighth Day of February, 2006

JON W. DUDAS
*Director of the United States Patent and Trademark Office*